(12) United States Patent
Hara et al.

(10) Patent No.: US 11,427,186 B2
(45) Date of Patent: Aug. 30, 2022

(54) PARKING ASSIST SYSTEM

(71) Applicant: HONDA MOTOR CO., LTD., Tokyo (JP)

(72) Inventors: Yuki Hara, Saitama (JP); Yasushi Shoda, Saitama (JP); Masaaki Kawano, Saitama (JP); Takeshi Iijima, Saitama (JP); Hiroshi Yamanaka, Saitama (JP); Megumi Kageyama, Saitama (JP); Eiichi Hoshino, Saitama (JP); Chihiro Kajihara, Saitama (JP); Hikaru Horiuchi, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 50 days.

(21) Appl. No.: 16/875,467

(22) Filed: May 15, 2020

(65) Prior Publication Data

US 2020/0398821 A1 Dec. 24, 2020

(30) Foreign Application Priority Data

Jun. 24, 2019 (JP) .............................. JP2019-116687
Dec. 13, 2019 (JP) .............................. JP2019-225932

(51) Int. Cl.
*B60W 30/06* (2006.01)
*B60W 30/18* (2012.01)
*B62D 15/02* (2006.01)

(52) U.S. Cl.
CPC ...... *B60W 30/06* (2013.01); *B60W 30/18109* (2013.01); *B62D 15/0285* (2013.01)

(58) Field of Classification Search
CPC ............ B60W 30/06; B60W 30/18109; B62D 15/0285
See application file for complete search history.

(56) References Cited

U.S. PATENT DOCUMENTS

| 6,816,085 B1 * | 11/2004 | Haynes | G08G 1/14 |
| | | | 340/932.2 |
| 2009/0251334 A1 * | 10/2009 | Yoshihashi | B60W 50/14 |
| | | | 340/932.2 |

(Continued)

FOREIGN PATENT DOCUMENTS

| CN | 108725436 A * | 11/2018 | ........... B60W 10/11 |
| EP | 835797 A2 * | 9/1997 | ............... B62D 1/28 |

(Continued)

OTHER PUBLICATIONS

CN-108725436—A Translation (Year: 2018).*
JP-2019196117—A Translation (Year: 2019).*

*Primary Examiner* — Jeff A Burke
*Assistant Examiner* — Kyle T Johnson
(74) *Attorney, Agent, or Firm* — Armstrong Teasdale LLP

(57) ABSTRACT

A parking assist system moves a vehicle autonomously from a current position to a target position. The parking assist system includes: a driving device configured to drive the vehicle; a control device configured to execute a setting process to set the target position and a driving process to control the driving device; a setting reception switch configured to receive an operation for starting the setting process; a driving reception switch configured to receive an operation for starting the driving process; a brake input member sensor configured to detect an input operation of a brake input member. The control device starts the setting process after the setting reception switch is operated, and starts the driving process on condition that a prescribed operation is performed when the driving reception switch is operated. The prescribed operation includes the input operation on the brake input member.

12 Claims, 10 Drawing Sheets

(56) References Cited

U.S. PATENT DOCUMENTS

| | | | | |
|---|---|---|---|---|
| 2010/0049402 A1* | 2/2010 | Tanaka | ................. | B60R 1/00 |
| | | | | 701/41 |
| 2012/0173080 A1* | 7/2012 | Cluff | ................ | B62D 15/028 |
| | | | | 701/41 |
| 2013/0252784 A1* | 9/2013 | Kinoshita | ........... | B60W 10/184 |
| | | | | 477/92 |
| 2016/0144857 A1* | 5/2016 | Ohshima | ............... | G08G 1/04 |
| | | | | 701/23 |
| 2018/0022345 A1* | 1/2018 | Seo | ................. | B60W 30/06 |
| | | | | 701/2 |
| 2018/0186365 A1* | 7/2018 | Kim | ................ | B60W 30/06 |
| 2020/0001864 A1* | 1/2020 | Oyama | ............... | B60W 50/14 |
| 2020/0398821 A1* | 12/2020 | Hara | ................ | B60W 30/06 |
| 2020/0406889 A1* | 12/2020 | Yamanaka | .............. | B60R 21/00 |
| 2021/0245734 A1* | 8/2021 | Harai | ............... | B60W 60/0025 |

FOREIGN PATENT DOCUMENTS

| | | |
|---|---|---|
| JP | H0532229 U | 4/1993 |
| JP | 2019196117 A * | 11/2019 |

* cited by examiner

PARKING ASSIST SYSTEM

TECHNICAL FIELD

The present invention relates to a parking assist system that moves a vehicle autonomously so as to execute a parking process and/or an unparking process.

BACKGROUND ART

There is a known automatic parking device that guides a vehicle to a garage (for example, Japanese Unexamined Utility Model Application Publication No. H05-32229U). This automatic parking device starts an automatic parking process to guide the vehicle to a parking position when a shift lever is set to a parking range and a prescribed switch is closed.

In this automatic parking device, when the shift lever is already set to the parking range, the vehicle moves only by a switch operation, which makes the vehicle convenient. However, if the switch operation is performed unintentionally, the vehicle may move even though the occupant such as a driver does not take a posture to check the surroundings.

To solve such a problem, the vehicle may move on condition that a brake pedal is pressed after the switch operation is performed. However, when the occupant mistakenly recognizes that the switch operation has been performed and releases the brake pedal even though the switch operation has not been performed, the vehicle may move against the occupant's intension due to a creep phenomenon or the like.

In view of such a problem of the prior art, a primary object of the present invention is to provide a parking assist system that is configured to move a vehicle autonomously from a current position to a target position and can prevent the vehicle from moving against the occupant's intention.

SUMMARY OF THE INVENTION

To achieve such an object, one embodiment of the present invention provides a parking assist system (1) configured to move a vehicle autonomously from a current position to a target position, including: a driving device (3) configured to drive the vehicle; a control device (15) configured to execute a setting process to set the target position and a driving process to control the driving device; a setting reception switch (34a) configured to receive an operation for starting the setting process; a driving reception switch (34b) configured to receive an operation for starting the driving process; and a brake input member sensor (27) configured to detect an input operation of a brake input member (24) related to braking of the vehicle, wherein the control device is configured to start the setting process after the setting reception switch is operated, and to start the driving process on condition that a prescribed operation is performed when the driving reception switch is operated, and the prescribed operation includes the input operation on the brake input member.

According to this arrangement, the driving process is started when the input operation on the brake input member and the operation on the driving reception switch are performed. In this way, the operation on the driving reception switch, in addition to the input operation on the brake input member, is included in a starting condition of the driving process. Accordingly, it is possible to prevent the vehicle from moving against the occupant's intention in a case where the occupant releases a brake pedal based on a false recognition that the vehicle moves autonomously.

Preferably, the parking assist system further includes a shift member (25) configured to receive an operation for selecting a shift position of the vehicle, wherein the prescribed operation includes the operation on the shift member for selecting the shift position so as to correspond to an autonomous movement of the vehicle.

According to this arrangement, the vehicle can be moved smoothly after the driving process is started.

Preferably, the parking assist system further includes a parking brake device (5a) configured to apply a brake force to the vehicle, wherein the prescribed operation includes an operation to release the parking brake device.

According to this arrangement, the vehicle can be moved smoothly after the driving process is started.

Preferably, the parking assist system further includes a notification device (14) configured to execute a notification to an occupant based on a signal from the control device, wherein the control device is configured to make the notification device execute a notification to urge the operation for selecting the shift position so as to correspond to the autonomous movement of the vehicle, a notification to urge the operation to release the parking brake device, and a notification to urge the operation on the driving reception switch.

According to this arrangement, the autonomous movement of the vehicle can be started after confirming the occupant's intention to start the driving process by making the occupant perform a plurality of operations. Thereby, it is possible to ensure the safety of the vehicle.

Preferably, at a start of the driving process, the control device makes the notification device execute a notification that the autonomous movement of the vehicle will start.

According to this arrangement, the notification device execute a notification to the occupant when the autonomous movement of the vehicle is started. Thus, the occupant can easily recognize the timing to start checking the surroundings.

Preferably, in a case where the brake input member sensor does not detect the input operation on the brake input member when the driving reception switch is operated, the control device makes the notification device execute a notification to urge the input operation on the brake input member.

According to this arrangement, the occupant can easily understand that the input operation on the brake input member is necessary to start driving the vehicle.

Preferably, the parking assist system further includes a notification device (14) configured to execute a notification to an occupant based on a signal from the control device, when the setting reception switch is operated, the control device makes the notification device execute a notification to urge the operation on the driving reception switch.

According to this arrangement, the occupant can easily understand that the operation on the driving reception switch is necessary to start driving the vehicle.

Preferably, in a case where the prescribed operation is not performed when the driving reception switch is operated, the control device does not start the driving process, and thereafter, when the prescribed operation is performed and the driving reception switch is operated again, the control device starts the driving process.

According to this arrangement, the driving of the vehicle is started when the operation on the driving reception switch and the prescribed operation are performed simultaneously. Thereby, it is possible to prevent the vehicle from being driven when the occupant carelessly performs the operation on the driving reception switch or the prescribed operation.

Preferably, in a case where the current position is a parallel parking position in which the vehicle is located along a passage, the control device sets the target position to one lateral side of an object in front of the current position in the setting process.

According to this arrangement, by moving the parallel-parked vehicle to the lateral side of the object located in front of the vehicle, it is possible to unpark the vehicle.

Preferably, the parking assist system further includes a shift actuator (17) configured to change the shift position, wherein the control device is configured to calculate a trajectory to move the vehicle forward or backward from the current position and to make the notification device notify the shift position that corresponds to a moving direction of the vehicle from the current position, and in a case where the shift member receives the operation for selecting the shift position notified by the notification device, the shift actuator changes the shift position so as to correspond to the trajectory on or after a start of the driving process.

According to this arrangement, the autonomous movement of the vehicle can be started after confirming the occupant's intention to start the driving process by making the occupant operate the shift member. Thereby, it is possible to ensure the safety of the vehicle. Further, the shift position is changed by the shift actuator after the driving operation is started. Thereby, it is possible to enhance the convenience of the vehicle.

Preferably, when the driving reception switch is operated after the setting process is completed, the control device starts the driving process on condition that the prescribed operation is performed.

According to this arrangement, the driving process is started when the driving reception switch is operated after the setting process is completed. Thus, the driving process can be executed after the setting process, so that it is possible to reliably prevent the vehicle from being driven before the setting process is completed.

Preferably, the parking assist system further includes a shift member (25) configured to receive an operation for selecting a shift position of the vehicle; and a parking brake device (5a) configured to apply a brake force to the vehicle, wherein in a case where a prescribed driving reception condition is satisfied after the setting reception switch is operated, the control device makes the driving reception switch receive the operation for starting the driving process, after the driving reception switch is operated, in a case where the setting process is completed and a prescribed driving start condition is satisfied, the control device starts the driving process to move the vehicle to the target position set in the setting process, the driving reception condition includes a condition that the shift position is set to a reverse position, a condition that the input operation on the brake input member is performed, and a condition that the parking brake device is driven, the driving start condition includes a condition that the parking brake device is released and a condition that the input operation on the brake input member is performed, and the control device is configured to drive the vehicle in response to release of the input operation on the brake input member in the driving process.

When the occupant sets the target position, the occupant may mistakenly recognize that the vehicle will move autonomously, and may stop the input operation on the brake input member. According to the above arrangement, the operation to start the driving process is received on condition that the parking brake device is driven. Therefore, by reliably driving the parking brake device, it is possible to prevent the vehicle from moving until the driving process is started. Accordingly, even if the occupant stops the input operation on the brake input member after setting the target position and before performing the operation to start the driving process, the braking force can be applied to the vehicle since the parking brake device is driven, so that the movement of the vehicle can be prevented. Thereby, it is possible to enhance the safety of the vehicle.

Preferably, the parking assist system further includes a warning device (33) configured to generate a warning sound, wherein in a case where the parking brake device is released after the input of the target position is received and before the driving reception switch is operated, the control device makes the warning device generate the warning sound.

According to this arrangement, the parking brake device can be driven more reliably after the target position is set and before the operation to start the driving process is received. Accordingly, it is possible to prevent the vehicle from moving after the target position is set and before the operation to start the driving process is received.

Preferably, in a case where the parking brake device is driven or the input operation on the brake input member is performed while the driving process is being executed, the control device suspends the autonomous movement of the vehicle.

According to this arrangement, the occupant can stop the vehicle when the vehicle moves against the occupant's intention. Thereby, it is possible to enhance the safety of the vehicle.

Preferably, in a case where the parking brake device and the input operation on the brake input member are released after the control device suspends the autonomous movement of the vehicle, the control device resumes the autonomous movement of the vehicle.

According to this arrangement, since the autonomous movement of the vehicle can be resumed by releasing the parking brake device and the input operation on the brake input member, it is possible to enhance the convenience of the parking assist system.

Thus, according to one embodiment of the present invention, it is possible to provide a parking assist system that is configured to move a vehicle autonomously from a current position to a target position and can prevent the vehicle from moving against the occupant's intention.

DESCRIPTION OF THE PREFERRED EMBODIMENT(S)

In the following, an embodiment of the present invention will be described in detail with reference to the drawings.

First Embodiment

Figure 1:
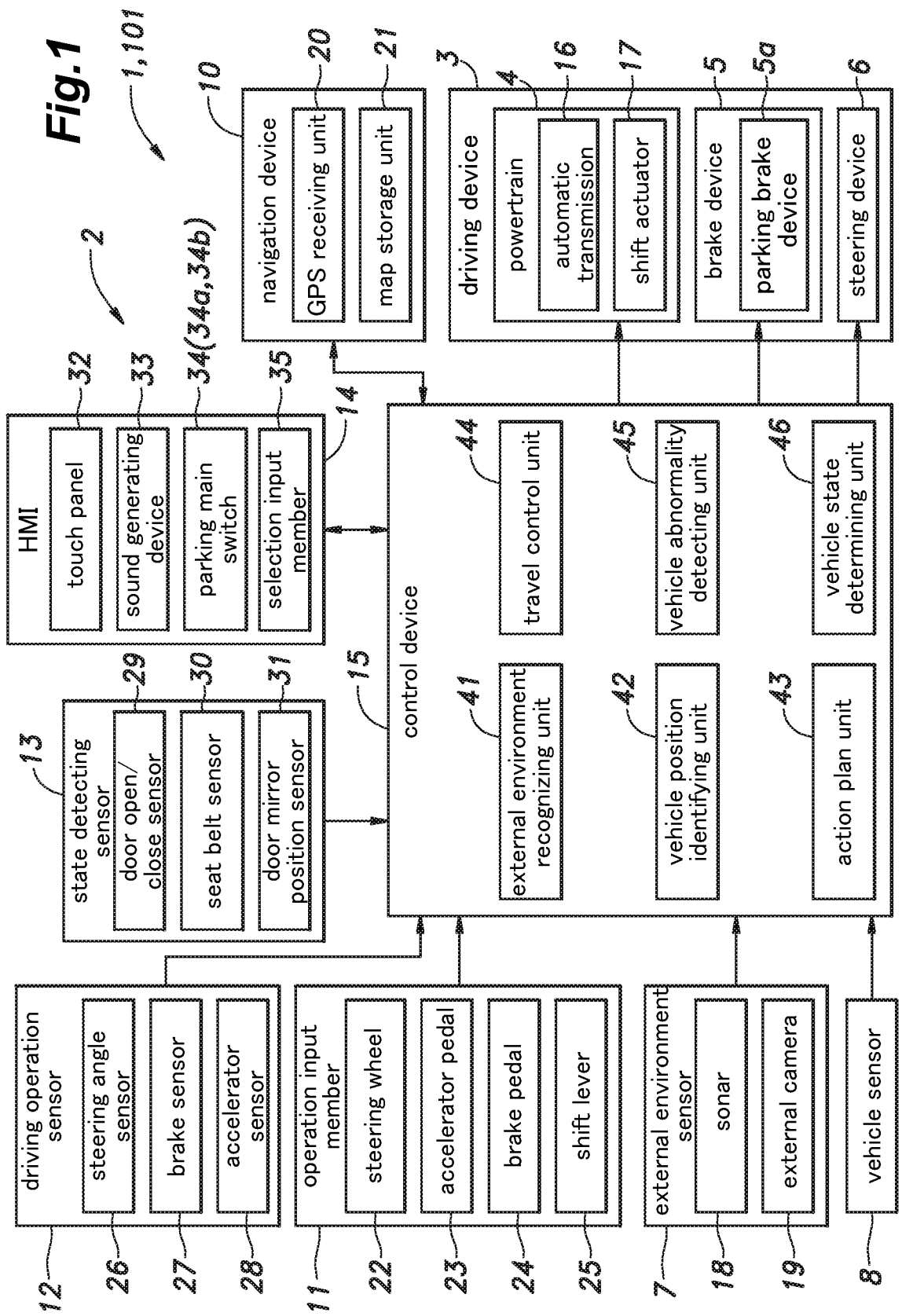
FIG. 1 is a functional block diagram of a vehicle provided with a parking assist system according to a first embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN). The powertrain 4, the brake device 5, and the steering device 6 constitute a driving device 3 configured to drive the vehicle.

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device 5a configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (a shift member). The shift lever 25 is configured to receive an operation for selecting the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes a driving device 3, the control device 15, the parking main switch 34, the brake sensor 27 as a brake input member sensor, the shift lever 25, the parking brake device 5a, and the HMI 14 as a notification device. The driving device 3 includes the powertrain 4, the brake device 5, and the steering device 6 and drives the vehicle. The HMI 14 notifies various kinds of information to the occupant so as to execute a notification to the occupant.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines that, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

In the present embodiment, the action plan unit 43 executes the automatic parking process or the automatic unparking process when the parking main switch 34 is pushed (operated). In the following, with reference to FIG. 2, the automatic unparking process executed by the action plan unit 43 when the parking main switch 34 is pushed will be described. In the following example, when the automatic unparking process is started, the own vehicle (hereinafter simply referred to as "the vehicle") is located in a parallel parking position (more specifically, a position between two surrounding vehicles (objects) aligned in the fore and aft direction) and a travel direction of the vehicle extends along a passage.

In the first step ST1 of the automatic unparking process, the action plan unit 43 calculates a trajectory to unpark the vehicle based on positions of the two surrounding vehicles acquired by the external environment recognizing unit 41. More specifically, first, the external environment recognizing unit 41 acquires the positions and sizes of the two surrounding vehicles located in front of and behind the vehicle, the obstacle, and the like. Thereafter, the action plan unit 43 determines whether sufficient spaces to move the vehicle are present on both lateral sides of the surrounding vehicle located in front of the vehicle (hereinafter referred to as "front surrounding vehicle"). In a case where the action plan unit 43 determines that sufficient spaces are present on both lateral sides of the front surrounding vehicle, the action plan unit 43 sets unparking position candidates to both lateral sides of the front surrounding vehicle. In a case where the action plan unit 43 determines that a sufficient space is present on the only one lateral side of the front surrounding vehicle, the action plan unit 43 sets an unparking position candidate to the only one lateral side of the front surrounding vehicle where the sufficient space is present. In a case where the action plan unit 43 determines that no sufficient space is present on either lateral side of the front surrounding vehicle, the action plan unit 43 makes the touch panel 32 display a notification that no sufficient space is present on either lateral side of the front surrounding vehicle, and then ends the automatic unparking process.

In a case where one or two unparking position candidates are set, the action plan unit 43 calculates the trajectory to move the vehicle forward to the unparking position candidates after moving the vehicle rearward. For example, in a case where the unparking position candidates can be set on both lateral sides of the front surrounding vehicle, the action plan unit 43 calculates a trajectory to move the vehicle to the unparking position candidate on the left side of the front surrounding vehicle and a trajectory to move the vehicle to the unparking position candidate on the right side of the front surrounding vehicle, respectively. Accordingly, by moving the vehicle along the trajectory, it is possible to move the parallel-parked vehicle to either lateral side of the front surrounding vehicle (namely, it is possible to unpark the vehicle). When the calculation of the trajectory is completed, the action plan unit 43 executes step ST2.

Incidentally, in the above step ST1, there may be a case where the action plan unit 43 can set one or two unparking position candidates but cannot calculate any trajectory from the current position of the vehicle to the unparking position candidates. In such a case, the action plan unit 43 may make the touch panel 32 display a notification that the trajectory cannot be calculated, and then end the automatic unparking process.

Figure 3A:
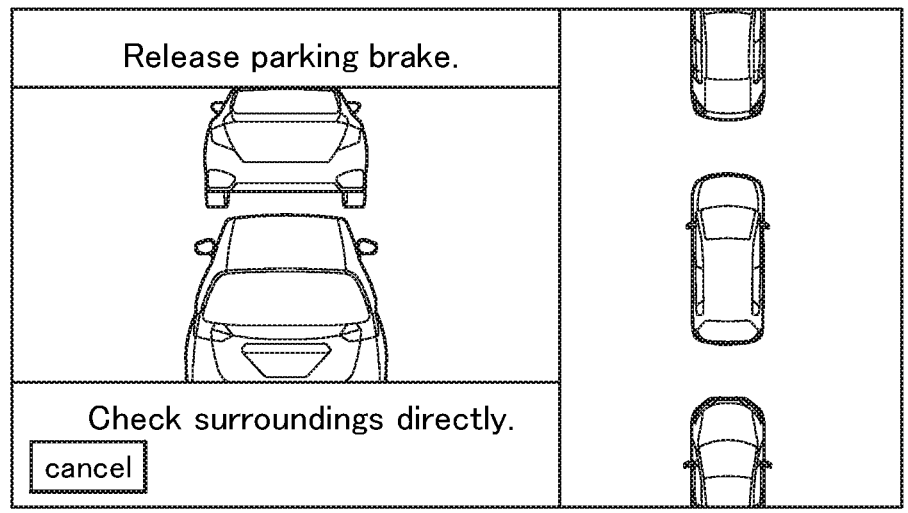
FIG. 3A is a diagram showing a screen display of a touch panel on which a release notification is displayed.

In step ST2, the action plan unit 43 makes the left half of the touch panel 32 display the bird's-eye image corresponding to a three-dimensional image of the vehicle and a part of its surrounding area positioned in front of the vehicle as viewed from above, and makes the right half of the touch panel 32 display the look-down image corresponding to a plan view of the vehicle and its surrounding area. Thereafter, the action plan unit 43 makes the touch panel 32 display a release notification (teaching) to urge the occupant to release the parking brake device 5a (see FIG. 3A). When the release notification is displayed, the action plan unit 43 executes step ST3.

In step ST3, the action plan unit 43 determines whether the parking brake device 5a is released. In a case where the parking brake device 5a is released, the action plan unit 43 executes step ST4, and in a case where the parking brake device 5a is not released, the action plan unit 43 waits at step ST3 (namely, the action plan unit 43 executes step ST3 repeatedly).

Figure 3B:
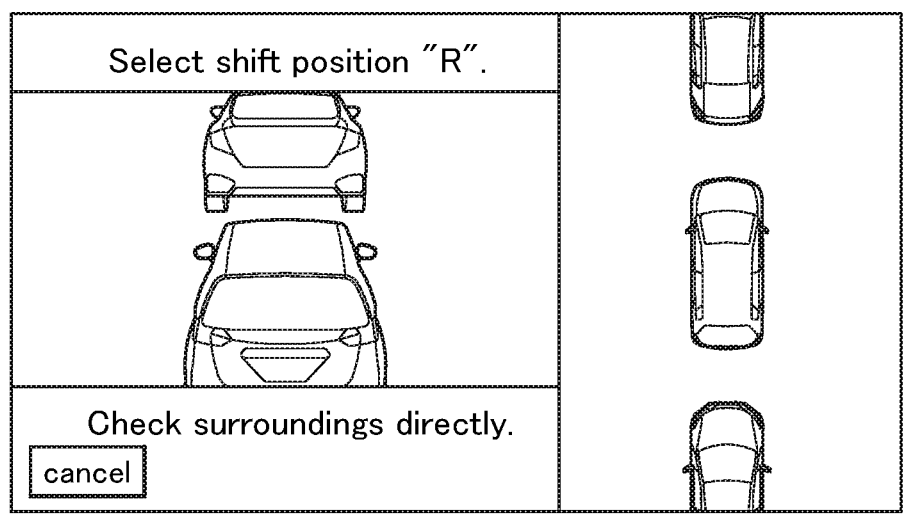
FIG. 3B is a diagram showing the screen display of the touch panel on which a select notification is displayed.
Figure 3C:
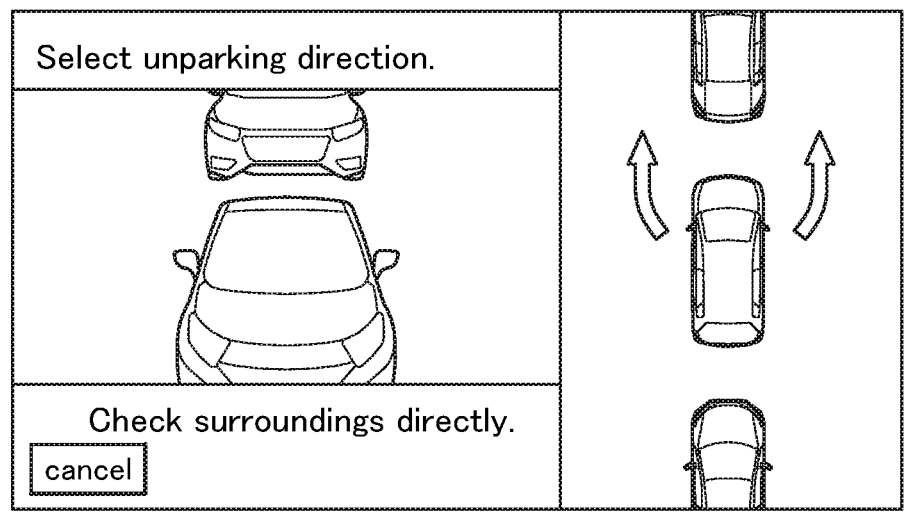
FIG. 3C is a diagram showing the screen display of the touch panel on which a selection screen of an unparking direction is displayed.

In step ST4, the action plan unit 43 determines a shift position that corresponds to the autonomous movement of the vehicle. In the present embodiment, in step ST1, the action plan unit 43 calculates the trajectory such that the vehicle moves forward after moving rearward. Accordingly, in step ST4, the action plan unit 43 determines the shift position that corresponds to the autonomous movement of the vehicle as an R position (reverse position). Thereafter, the action plan unit 43 makes the touch panel 32 display a select notification to urge the occupant to operate the shift lever 25 for selecting the R position (see FIG. 3B). When the R position is selected, the action plan unit 43 makes the touch panel 32 change the image on the left half thereof from the bird's-eye image corresponding to the vehicle and a part of its surrounding area positioned in front of the vehicle to the bird's-eye image corresponding to the vehicle and a part of its surrounding area positioned behind the vehicle (see FIG. 3C). Thereafter, the action plan unit 43 drives the shift actuator 17 so as to change the shift position to the R position. When a detecting unit (not shown) provided in the powertrain 4 detects that the shift position is changed to the R position, the action plan unit 43 executes step ST5.

In step ST5, the action plan unit 43 executes a setting process to set the target unparking position and the trajectory along which the vehicle should travel. In the setting process, the action plan unit 43 makes the occupant select the desired one unparking position candidate from one or two unparking position candidates set in step ST1. More specifically, the action plan unit 43 first makes the touch panel 32 display a selection screen to make the occupant select the desired one unparking position candidate from one or two unparking position candidates set in step ST1. In the present embodiment, in a case where two unparking position candidates are set in step ST1, the action plan unit 43 may make the touch panel 32 display the look-down image including two arrows that indicate two trajectories respectively corresponding to the two unparking position candidates (see FIG. 3C). Thereafter, the action plan unit 43 may make the touch panel 32 receive a selection operation of the desired one unparking position candidate by making the occupant perform a touching operation on either one of the two arrows. In a case where the only one unparking position candidate is set in step ST1, the action plan unit 43 may make the touch panel 32 display the look-down image including an arrow that indicates a trajectory corresponding to the only one unparking position candidate. Thereafter, the touch panel 32 may receive the selection operation (approval operation) of the unparking position candidate by making the occupant perform a touching operation on the arrow. In a case where the touch panel 32 receives the selection operation, the action plan unit 43 sets the selected unparking position candidate as the target unparking position, and sets the trajectory to the target unparking position as the trajectory along which the vehicle should travel. When the setting process is completed, the action plan unit 43 executes step ST6.

In step ST6, the action plan unit 43 determines whether the brake pedal 24 is pressed (operated). At this time, the action plan unit 43 acquires the pressing amount of the brake pedal 24 from the brake sensor 27, and determines that the brake pedal 24 is pressed when the acquired pressing amount is equal to or more than a prescribed pressing threshold. On the other hand, the action plan unit 43 determines that the brake pedal 24 is not pressed when the acquired pressing amount is less than the prescribed pressing threshold. The action plan unit 43 executes step ST7 in a case where the action plan unit 43 determines that the brake pedal 24 is pressed, and executes step ST8 in a case where the action plan unit 43 determines that the brake pedal 24 is not pressed. In a case where the action plan unit 43 determines that the brake pedal 24 is pressed while the touch panel 32 displays a pop-up window that includes a pressing notification to urge the occupant to press the brake pedal 24 (namely, to urge the input operation on the brake pedal 24), the action plan unit 43 may make the touch panel 32 delete the pop-up window before executing step ST7.

In step ST7, the action plan unit 43 determines whether an input to the parking main switch 34 is performed, that is, whether the parking main switch 34 is pushed. The action plan unit 43 executes step ST9 in a case where the parking main switch 34 is pushed, and executes step ST10 in a case where the parking main switch 34 is not pushed.

Figure 4:
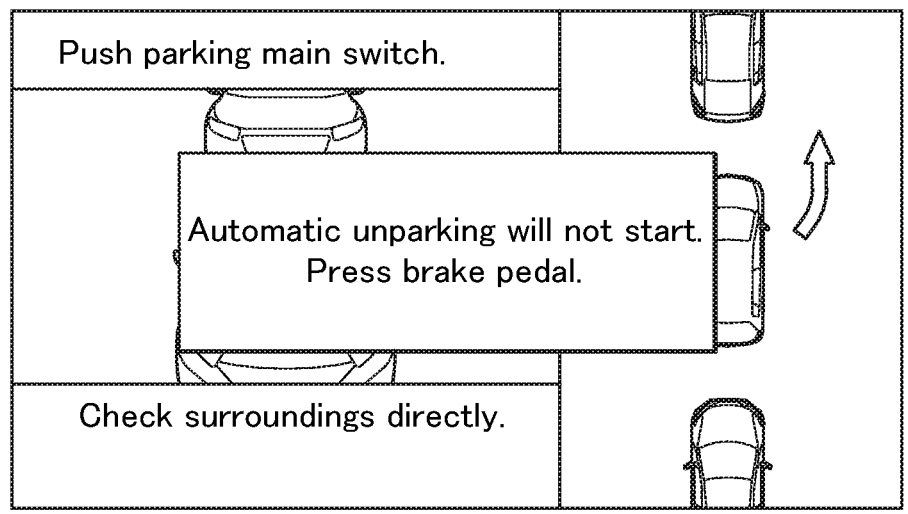
FIG. 4 is a diagram showing the screen display of the touch panel on which a pressing notification is displayed.

In step ST8, the action plan unit 43 makes the touch panel 32 display the pop-up window including the pressing notification to urge the occupant to press the brake pedal 24 (namely, to urge the input operation on the brake pedal 24) until the pressing of the brake pedal 24 is detected (see FIG. 4). As shown in FIG. 4, the above pop-up window may include the pressing notification such as "Automatic unparking will not start. Press brake pedal." At this time, the action plan unit 43 may make the sound generating device 33 generate a sound to urge the occupant to press the brake pedal 24. The sound generated by the sound generating device 33 at this time may be the same as a warning sound generated by the sound generating device 33 when failure or abnormality of the vehicle is detected, or may be a voice telling that "Automatic unparking will not start. Press brake pedal." Also, when the pressing of the brake pedal 24 is not detected for a prescribed time in step ST8, the action plan unit 43 may fix the vehicle by changing the shift position to a parking position or driving the parking brake device 5*a*. When the pop-up window including the pressing notification is displayed, the action plan unit 43 executes step ST6.

In step ST9, the action plan unit 43 determines, based on the detection result of the brake sensor 27, whether the brake pedal 24 has been continuously pressed after determining that the brake pedal 24 is pressed in step ST6. When the action plan unit 43 determines that the brake pedal 24 has been continuously pressed, the action plan unit 43 executes step ST11. When the action plan unit 43 determines that the brake pedal 24 has not been continuously pressed, the action plan unit 43 executes step ST8.

Figure 5A:
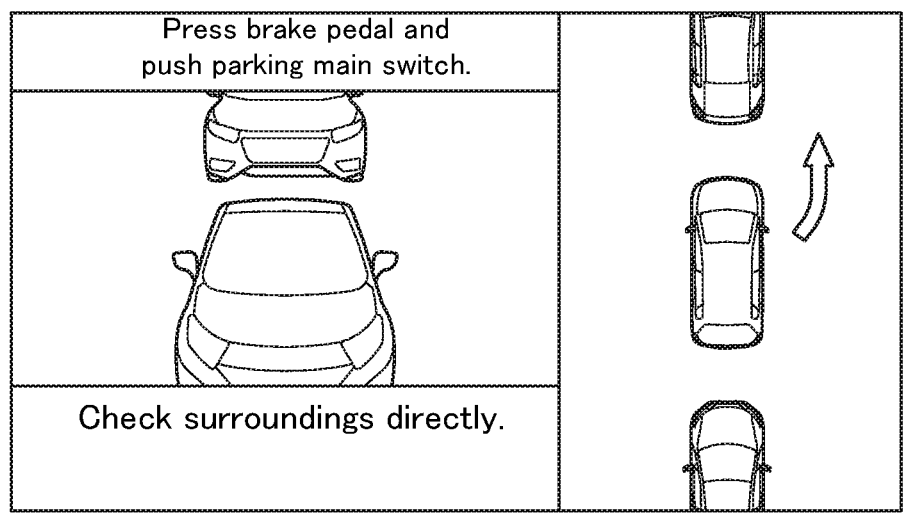
FIG. 5A is a diagram showing the screen display of the touch panel on which a pushing notification is displayed.

In step ST10, as shown in FIG. 5A, the action plan unit 43 makes the touch panel 32 display a pushing notification to urge the occupant to push the parking main switch 34 (namely, to urge the operation on the parking main switch 34). At the same time, the action plan unit 43 may make the touch panel 32 display the pressing notification to urge the occupant to press the brake pedal 24. The pushing notification may be displayed within a few seconds (2-3 seconds) from the release notification in step ST2. For example, the pushing notification may be displayed after 1.7 seconds from the release notification in step ST2. When the pushing notification is displayed on the touch panel 32, the action plan unit 43 executes step ST6.

Figure 5B:
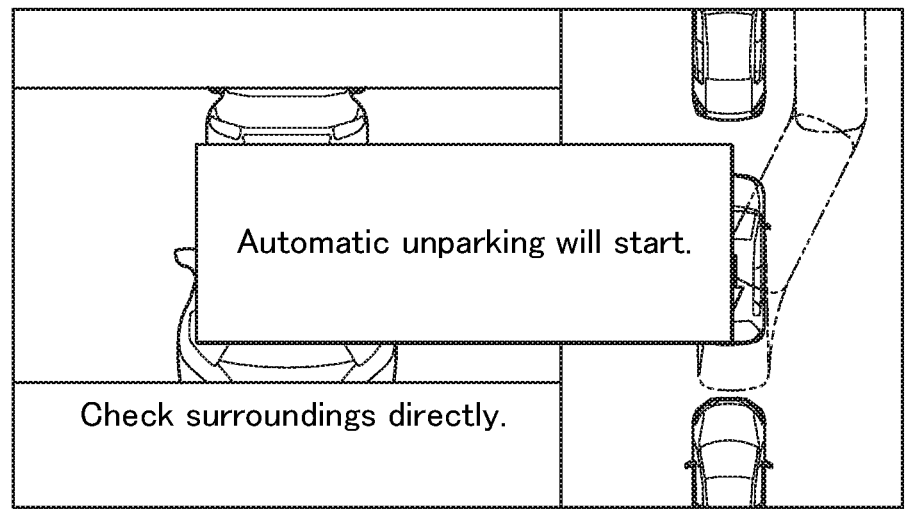
FIG. 5B is a diagram showing the screen display of the touch panel on which a pop-up window to notify that an autonomous movement of the vehicle will start.
Figure 5C:
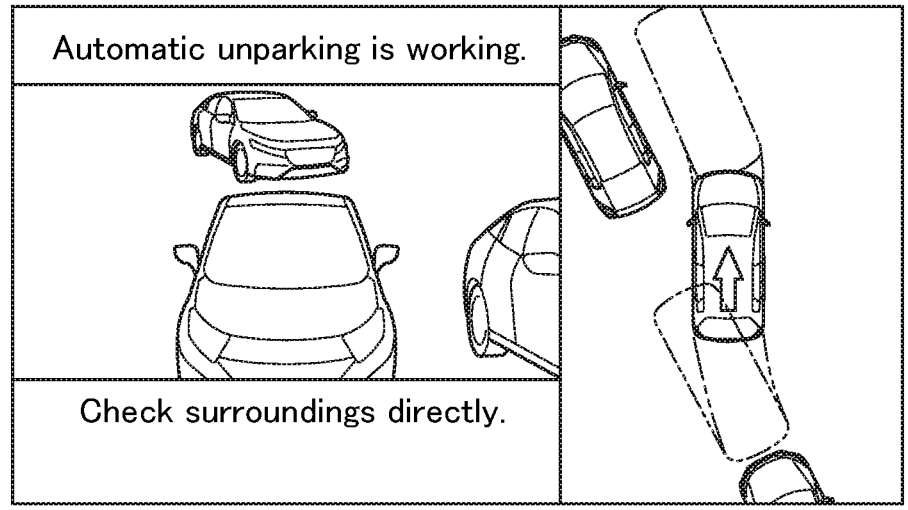
FIG. 5C is a diagram showing the screen display of the touch panel during the unparking of the vehicle.

In step ST11, the action plan unit 43 gives an instruction to the travel control unit 44 and executes a driving process to move the vehicle autonomously from the current position to the target unparking position. More specifically, when the driving process is started, the action plan unit 43 first makes the touch panel 32 display a pop-up window for a prescribed period. This pop-up window includes a start notification that the autonomous movement (automatic unparking) of the vehicle will start (see FIG. 5B). At the same time, the action plan unit 43 may make the sound generating device 33 generate a sound to notify that the autonomous movement of the vehicle will start (for example, a voice telling that "Automatic unparking will start.") Thereafter, when the pressing of the brake pedal 24 is released, the action plan unit 43 controls the driving device 3 so as to make the vehicle travel along the trajectory. At this time, the shift position may be appropriately changed by the shift actuator 17. In the driving process, the vehicle moves toward either lateral side of the front surrounding vehicle (namely, toward the target unparking position). At this time, as shown in FIGS. 5B and 5C, the action plan unit 43 may make the touch panel 32 display the trajectory (see two-dot chain lines) along which the vehicle should travel on the lookdown image. Further, the action plan unit 43 may make the touch panel 32 display an arrow that indicates the travel direction of the vehicle on the look-down image. In the present embodiment, the action plan unit 43 updates the bird's eye image and the look-down image displayed on the touch panel 32 in accordance with the movement of the vehicle until the vehicle moves to the target unparking position. When the movement of the vehicle to the target unparking position is completed, that is, when the automatic unparking of the vehicle is completed, the action plan unit 43 completes the automatic unparking process.

Next, the operations and effects of the parking assist system 1 configured as described above will be further described. After the vehicle is stopped, in a case where the parking main switch 34 is pushed and the automatic unparking process is started, the trajectory to unpark the vehicle is calculated (step ST1). Thereafter, in a case where the parking brake device 5*a* is not released, the release notification to urge the occupant to release the parking brake device 5*a* is displayed on the touch panel 32 (step ST2). In a case where the occupant such as a driver releases the parking brake device 5*a* (Yes in step ST3), the select notification to urge the occupant to select the R position is displayed on the touch panel 32 (step ST4). In a case where the occupant operates the shift lever 25 for selecting the R position, the shift actuator 17 changes the shift position to the R position and the setting process is executed (step ST5). In the setting process, the selection screen to select the trajectory to unpark the vehicle is displayed on the touch panel 32. In a case where the occupant selects the trajectory by the input to the touch panel 32, the trajectory of the vehicle is set based on the occupant's selection.

As described above, the setting process is started on condition that the parking main switch 34 is pushed. Therefore, the parking main switch 34 functions as a setting reception switch 34*a* configured to receive an operation for starting the setting process by the occupant.

Next, when the setting of the trajectory is completed, the pop-up window including the pressing notification to urge the occupant to press the brake pedal 24 is displayed on the touch panel 32 (step ST8). Thereafter, in a case where the occupant such as the driver presses the brake pedal 24, the pushing notification to urge the occupant to push the parking main switch 34 is displayed on the touch panel 32 (step ST10). Thereafter, in a case where the parking main switch 34 is operated (Yes in step ST7) and the brake pedal 24 is continuously pressed (Yes in step ST9), the start of the driving process is permitted. Thereafter, when the pressing of the brake pedal 24 is released, the vehicle moves from the current position to the target unparking position (step ST11). That is, the parking main switch 34 also functions as a driving reception switch 34*b* configured to receive an operation for starting the driving process by the occupant on condition that the brake pedal 24 is continuously pressed.

In a case where the prescribed operation (pressing of the brake pedal 24) is continued (step ST6, step ST9) and the parking main switch 34 is pushed (step ST7), the driving process is started. That is, the pressing of the brake pedal 24 (input operation on the brake input member) and the push of the parking main switch 34 (operation on the driving reception switch 34*b*) are set to be a condition to start the driving process. Accordingly, it is possible to prevent the vehicle from moving against the occupant's intention due to a creep phenomenon or the like in a case where the occupant releases the brake pedal 24 based on a false recognition that the vehicle moves autonomously even though the parking main switch 34 is not pushed.

Figure 2:
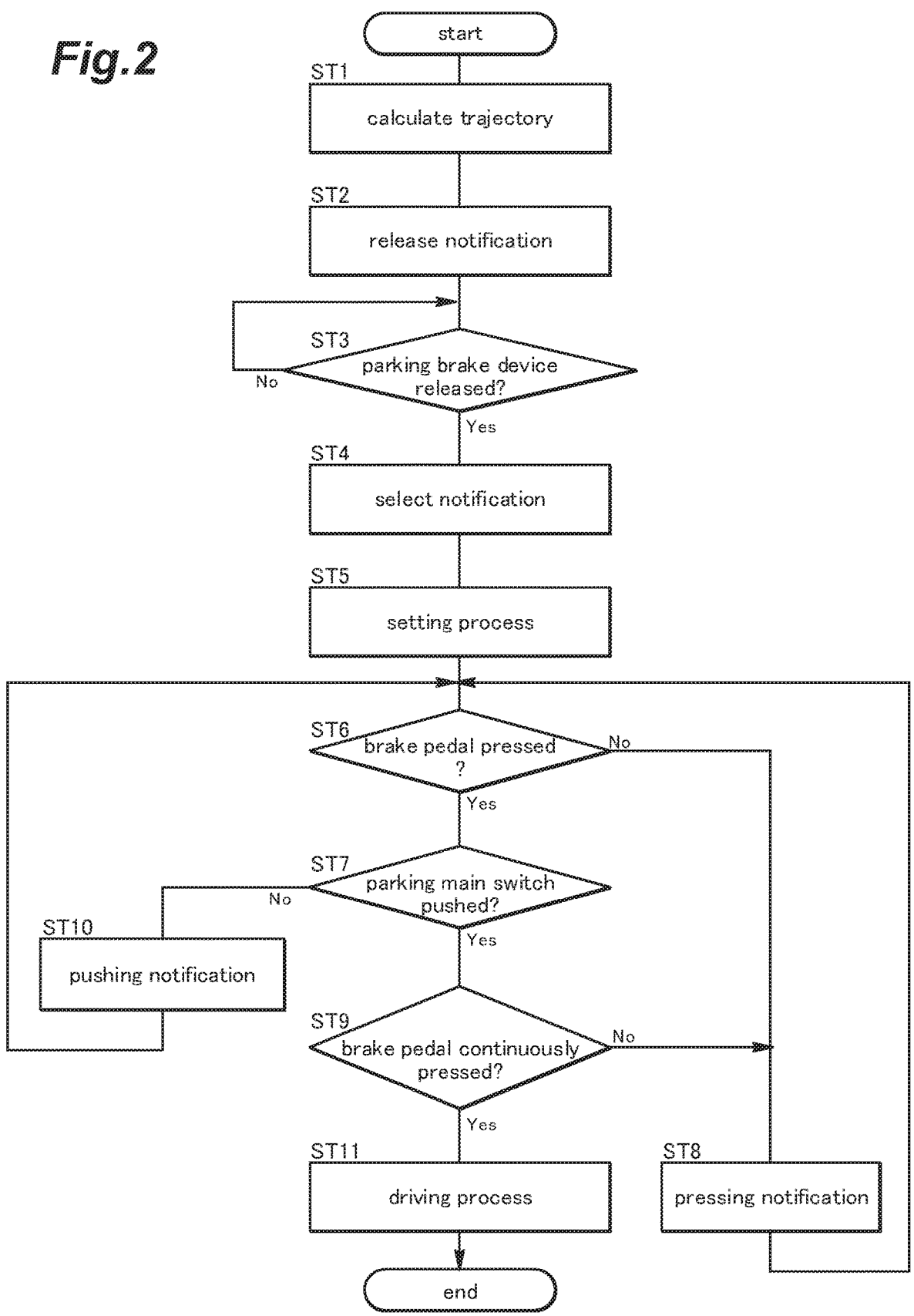
FIG. 2 is a flow chart of an automatic unparking process of the parking assist system according to the first embodiment of the present invention.

As shown in FIG. 2, after the shift position is changed to the R position in step ST4, the driving process is executed. That is, the operation on the shift lever 25 for selecting the shift position so as to correspond to the autonomous movement of the vehicle from the current position to the target unparking position is set to the condition to start the driving process. Thus, the shift position is changed to a position corresponding to the autonomous movement of the vehicle before the driving process is started, so that the vehicle can be moved smoothly after the driving process is started.

As shown in FIG. 2, after the parking brake device 5a is released in step ST3, the driving process is executed. That is, the release of the parking brake device 5a is set to the condition to start the driving process. Thus, the parking brake device 5a is released before the driving process is started, so that the vehicle can be moved smoothly after the driving process is started.

When the driving process is started (step ST11), the pop-up window including the start notification that the autonomous movement (automatic unparking) of the vehicle will start is displayed on the touch panel 32 (see FIG. 5B). In this way, at the start of the autonomous movement of the vehicle, the touch panel 32 notifies the occupant that the movement of the vehicle will start. That is, the touch panel 32 functions as a notification device configured to execute a notification to the occupant based on a signal from the control device 15. Also, since the touch panel 32 displays the start notification when the movement of the vehicle is started, the occupant can easily recognize the timing to start checking the surroundings. Accordingly, it is possible to surely make the occupant check the surroundings during the automatic unparking process and thereby to improve the safety of the vehicle.

After the parking main switch 34 is pushed so as to start the automatic unparking process, the setting process is executed (step ST5). Thereafter, when the occupant presses the brake pedal 24, the pushing notification to urge the occupant to push the parking main switch 34 again is displayed on the touch panel 32 (step ST10). Accordingly, the occupant can easily understand that the push of the parking main switch 34 (operation on the driving reception switch 34b) is necessary to start driving the vehicle.

Thereafter, in a case where the parking main switch 34 is pushed (Yes in step ST7) but the brake pedal 24 has not been continuously pressed (No in step ST9), the driving process is not executed and the pressing notification to urge the occupant to press the brake pedal 24 is displayed on the touch panel 32 (step ST8). Thereafter, when the parking main switch 34 is pushed again (Yes in step ST7) in a state where the brake pedal 24 is pressed (Yes in step ST6, step ST9), the driving process is executed. As described above, the driving process is executed when both the push of the parking main switch 34 and the pressing of the brake pedal 24 are performed at the same time. Accordingly, the vehicle does not move when the occupant performs one of the above two operations unintentionally, so that it is possible to enhance the safety of the vehicle.

In the present embodiment, as shown in FIG. 2, the action plan unit 43 starts the driving operation on condition that the parking main switch 34 (the driving reception switch 34b) is pushed (operated) after the setting process is completed. Thus, even in a case where the calculation of the trajectory requires a relatively long time, it is possible to reliably prevent the driving operation from being started before the setting process is completed.

Second Embodiment

The parking assist system 101 according to the second embodiment is different from the parking assist system 1 according to the first embodiment only in the automatic unparking process executed by the action plan unit 43, and is similar to the parking assist system 1 according to the first embodiment in the other processes. In the following, with reference to FIG. 6, the automatic unparking process executed by the action plan unit 43 will be described.

Figure 7A:
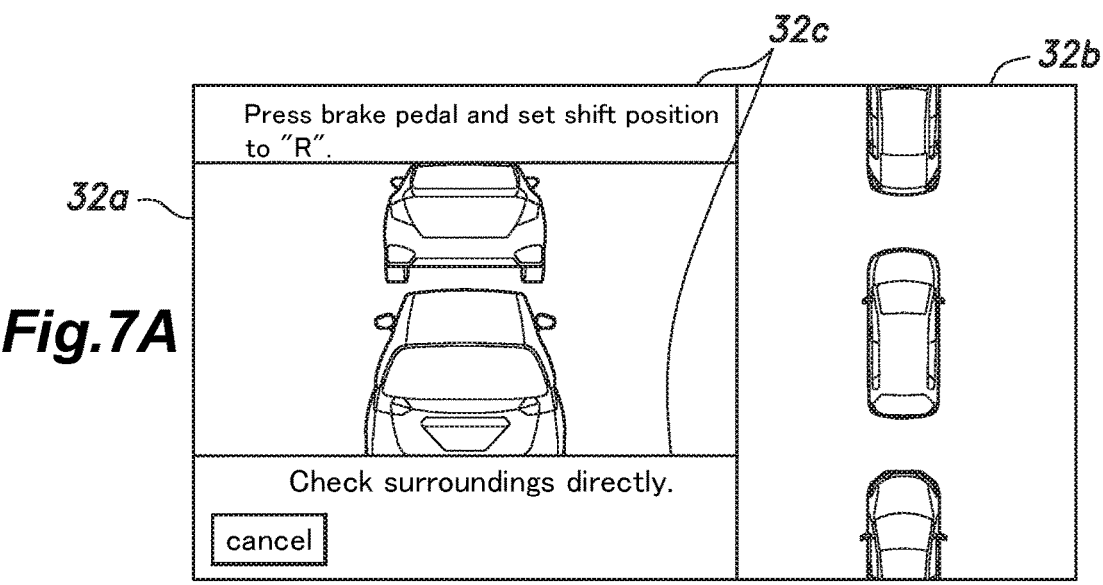
FIG. 7A is a diagram showing a screen display of a touch panel immediately after the automatic unparking process is started.

When the parking main switch 34 (the setting reception switch 34a) is pushed (operated), the action plan unit 43 starts the first step ST21 of the automatic unparking process. In the first step ST21 of the automatic unparking process, the action plan unit 43 makes the touch panel 32 display a pressing/setting notification to urge the occupant to press the brake pedal 24 and to operate the shift lever 25 so as to set(select) the shift position to the R position. More specifically, as shown in FIG. 7A, the action plan unit 43 makes the touch panel 32 display the bird's-eye image 32a in front of the vehicle in the left half thereof, and makes the touch panel 32 display the look-down image 32b in the right half thereof. At the same time, the action plan unit 43 makes the touch panel 32 display notification windows 32c for executing a notification to the occupant above and below the bird's-eye image 32a. For example, the action plan unit 43 makes the touch panel 32 display the pressing/setting notification in the notification window 32c above the bird's-eye image 32a. When the pressing/setting notification is displayed, the action plan unit 43 executes step ST22.

In step ST22, the action plan unit 43 acquires the signal from the brake sensor 27. Next, the action plan unit 43 determines whether the brake pedal 24 is pressed and the shift position is set to the R position based on the signal acquired from the brake sensor 27. In a case where the brake pedal 24 is pressed and the shift position is set to the R position, the action plan unit 43 executes step ST23. In a case where the brake pedal 24 is not pressed or the shift position is not set to the R position, the action plan unit 43 waits at step ST22 (namely, the action plan unit 43 executes step ST22 repeatedly) until the brake pedal 24 is pressed and the shift position is set to the R position.

Figure 7B:
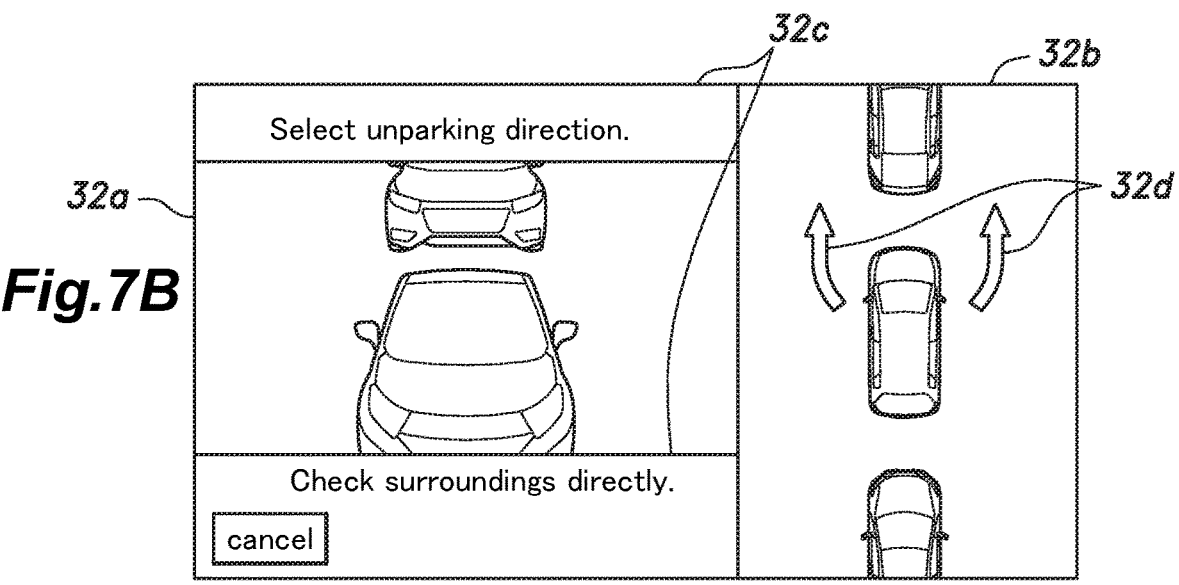
FIG. 7B is a diagram showing the screen display of the touch panel after a brake pedal is pressed and a shift position is changed to a reverse position.

In step ST23, the action plan unit 43 starts a setting process similar to the first embodiment. In step ST23, the action plan unit 43 determines whether sufficient spaces to move the vehicle are present on both lateral sides of the front surrounding vehicle based on the signal from the external environment recognizing unit 41. In a case where one or two sufficient spaces are present, these spaces are set to one or two unparking position candidates. Next, the action plan unit 43 makes the touch panel 32 display the selection screen to make the occupant select the desired one unparking position candidate from one or two unparking position candidates. As shown in FIG. 7B, in a case where two unparking position candidates are set, the action plan unit 43 makes the touch panel 32 display the look-down image 32b including two arrows 32d that indicate two trajectories respectively corresponding to the two unparking position candidates. Thereafter, the action plan unit 43 makes the touch panel 32 receive a selection operation of the desired one unparking position candidate by making the occupant perform a touching operation on either one of the two arrows 32d. In the present embodiment, in a case where two unparking position candidates are set, one of the two unparking position candidates is selected and set to a provisional target unparking position. The action plan unit 43 holds the selected unparking position candidate as the provisional target unparking position until the parking main switch 34 is pushed. When the setting process is started and the selection screen is displayed, the action plan unit 43 executes step ST24.

In step ST24, the action plan unit 43 determines whether the parking brake device 5a is driven. In a case where the parking brake device 5a is driven, the action plan unit 43 executes step ST25. In a case where the parking brake device 5*a* is not driven, the action plan unit 43 executes step ST26.

Figure 7C:
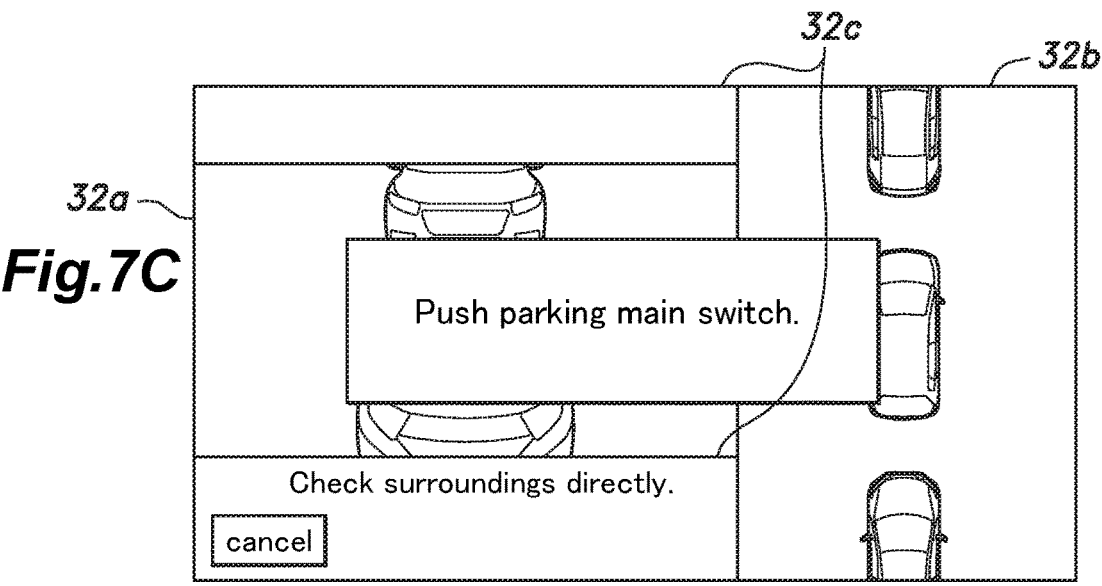
FIG. 7C is a diagram showing the screen display of the touch panel after an unparking direction is selected.

In step ST25, the action plan unit 43 makes the touch panel 32 display the pushing notification to urge the occupant to push the parking main switch 34 (namely, to urge the operation on the driving reception switch 34*b*). More specifically, the action plan unit 43 makes the touch panel 32 display a pop-up window 32*e* that includes the pushing notification as shown in FIG. 7C. In the present embodiment, the action plan unit 43 displays the pop-up window 32*e* on the bird's-eye image 32*a* and the look-down image 32*b*. When the pop-up window 32*e* is displayed, the action plan unit 43 executes step ST27.

Figure 8A:
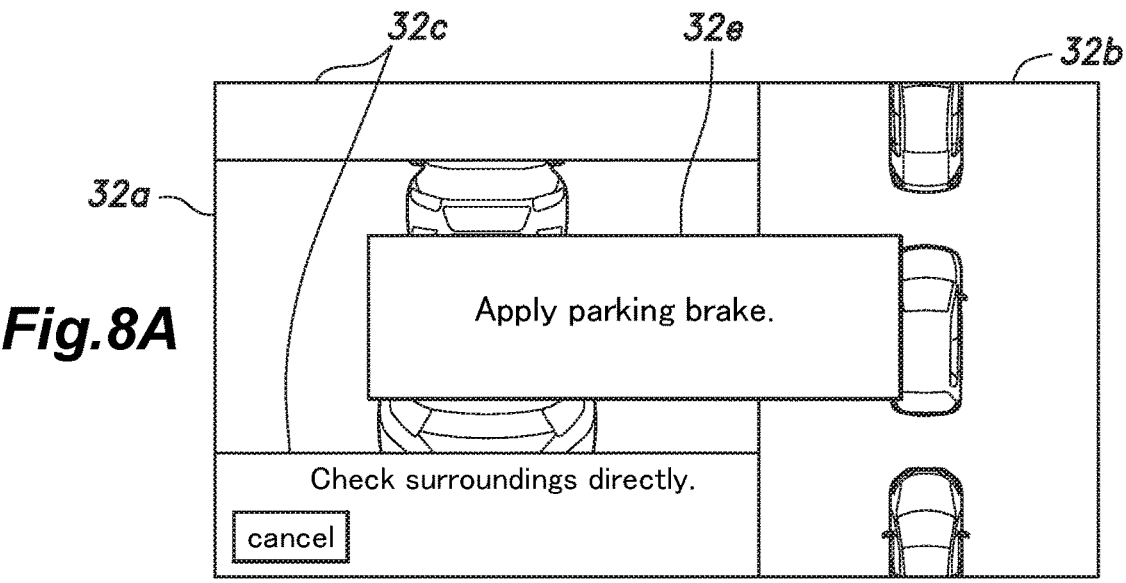
FIG. 8A is a diagram showing the screen display of the touch panel when a parking brake device is released before an input to a parking main switch is received.

In step ST26, the action plan unit 43 makes the touch panel 32 display the pop-up window 32*e* including a driving notification to urge the occupant to drive the parking brake device 5*a*, as shown in FIG. 8A. Further, the action plan unit 43 makes the sound generating device 33 generate a prescribed warning sound so as to warn the occupant that the parking brake device 5*a* is released. That is, the sound generating device 33 functions as a warning device configure to generate the warning sound so as to warn the occupant. When the driving notification is displayed and the warning sound is generated, the action plan unit 43 returns to step ST24.

In step ST27, the action plan unit 43 determines whether the parking main switch 34 (the driving reception switch 34*b*) is pushed. In a case where the parking main switch 34 is pushed, the action plan unit 43 executes step ST28. In a case where the parking main switch 34 is not pushed, the action plan unit 43 waits at step ST 27 until the parking main switch is pushed (namely, the action plan unit 43 executes step ST27 repeatedly).

In step ST28, the action plan unit 43 sets the provisional target unparking position set in step ST23 as the target unparking position, and ends the setting process. Next, the action plan unit 43 calculates a trajectory to unpark the vehicle from the current position to the target unparking position based on the positions of the surrounding vehicles acquired from the external environment recognizing unit 41. In the present embodiment, the action plan unit 43 calculates the trajectory to move the vehicle forward to the target unparking position after moving the vehicle rearward. In a case where such a trajectory cannot be calculated, the action plan unit 43 may calculate the trajectory to move the vehicle forward and backward repeatedly. When the calculation of the trajectory is completed, the action plan unit 43 executes step ST29.

Figure 8B:
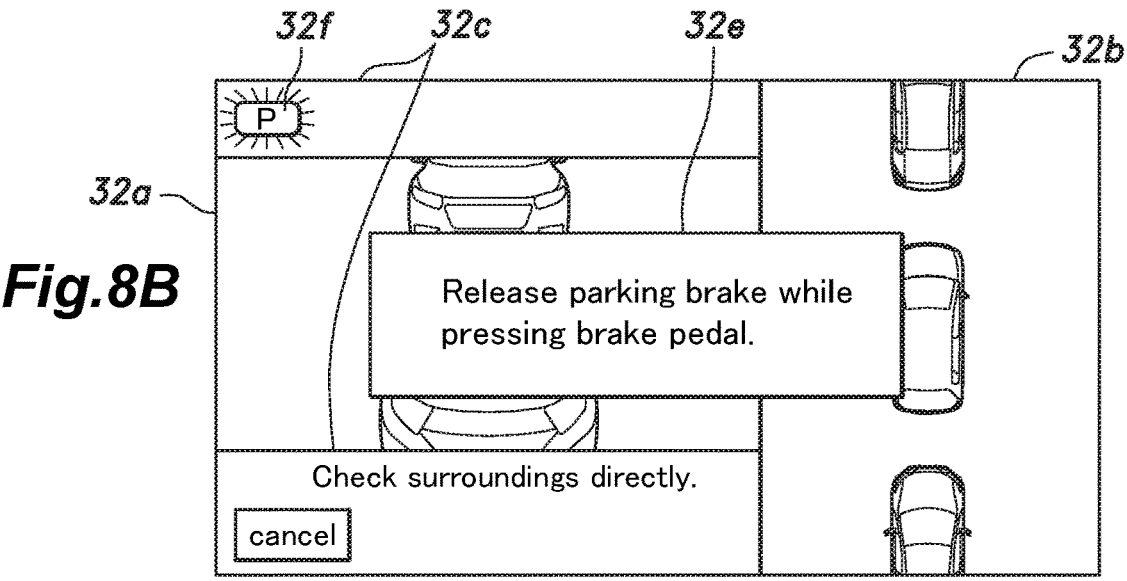
FIG. 8B is a diagram showing the screen display of the touch panel after the input to the parking main switch is received.

In step ST29, the action plan unit 43 makes the touch panel 32 display the release notification to urge the occupant to release the parking brake device 5*a*. More specifically, as shown in FIG. 8B, the action plan unit 43 makes the touch panel 32 display a pop-up window 32*e* including the release notification. In the present embodiment, the action plan unit 43 makes the touch panel 32 display the pop-up window 32*e* including the release notification on the look-down image 32*b* and the bird's-eye image 32*a*. At the same time, the action plan unit 43 may make the touch panel 32 display a prescribed icon 32*f* in the notification window 32*c* above the bird's-eye image 32*a* to indicate that the autonomous movement (automatic unparking) of the vehicle will start, and may make the touch panel 32 blink the icon 32*f*. In the present embodiment, the blink of the icon 32*f* is continued until the automatic unparking process is completed. When the pop-up window 32*e* is displayed, the action plan unit 43 executes step ST30.

In step ST30, the action plan unit 43 determines whether the parking brake device 5*a* is released. In a case where the parking brake device 5*a* is not released, the action plan unit 43 waits at step ST30 until the parking brake device 5*a* is released (namely, the action plan unit 43 executes step ST30 repeatedly). In a case where the parking brake device 5*a* is released, the action plan unit 43 executes step ST31.

In step ST31, the action plan unit 43 determines whether the brake pedal 24 is pressed. In a case where the brake pedal 24 is not pressed, the action plan unit 43 waits at step ST31 until the brake pedal 24 is pressed (namely, the action plan unit 43 executes step ST31 repeatedly). In a case where the brake pedal 24 is pressed, the action plan unit 43 executes step ST32.

Figure 8C:
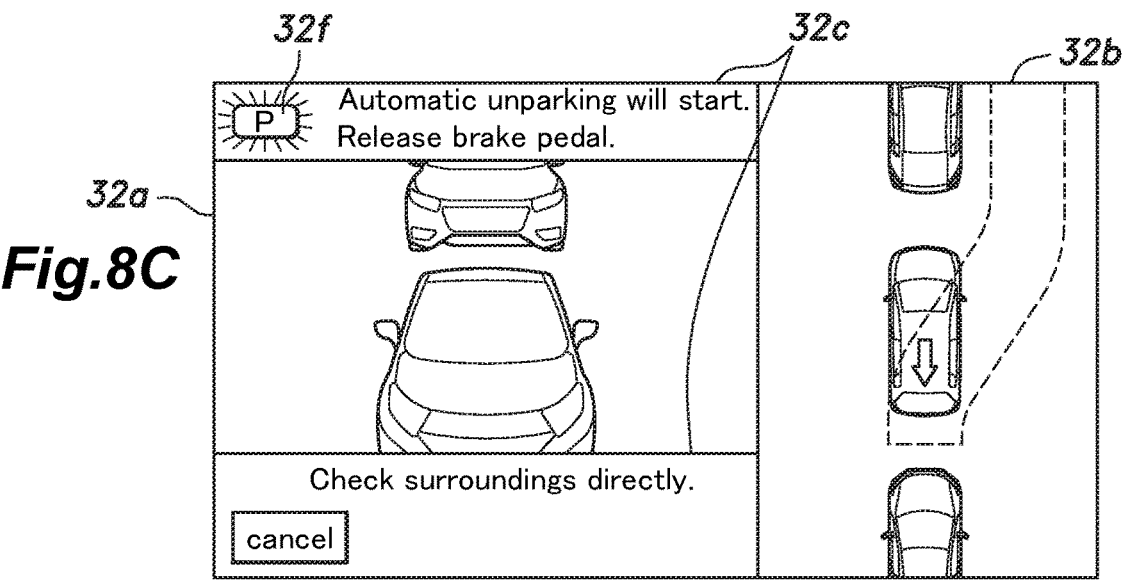
FIG. 8C is a diagram showing the screen display of the touch panel when the parking brake device is released in a state where a brake pedal is pressed.

In step ST32, the action plan unit 43 gives an instruction to the travel control unit 44 and executes a driving process to move the vehicle autonomously from the current position to the target unparking position. First, as shown in FIG. 8C, the action plan unit 43 makes the touch panel 32 display a start notification that the autonomous movement (automatic unparking) of the vehicle will start and a notification to urge the occupant to release the brake pedal 24 on the notification window 32*c* above the bird's-eye image 32*a*. Thereafter, the action plan unit 43 accelerates the vehicle in accordance with the release of the brake pedal 24 and moves the vehicle to the target unparking position. In order to indicate that the vehicle is moving, the action plan unit 43 may make the touch panel 32 display the blinking icon 32*f* in the notification window 32*c* above the bird's-eye image 32*a* as in step ST29 while the vehicle is moving.

The action plan unit 43 suspends the autonomous movement of the vehicle when a prescribed suspension condition is satisfied during the driving process. The suspension condition includes, for example, a condition that the steering wheel 22 is operated and/or a condition that the seat belt in a driver's seat is released. The action plan unit 43 also suspends the autonomous movement of the vehicle when the parking brake device 5*a* is driven or the brake pedal 24 is pressed during the driving process. Thus, in a case where the vehicle moves against the occupant's intention during the driving process, the occupant can stop the autonomous movement of the vehicle by driving the parking brake device 5*a* or pressing the brake pedal 24. Thereby, it is possible to enhance the safety of the vehicle.

After the autonomous movement of the vehicle is suspended, in a case where the parking brake device 5*a* and the brake pedal 24 are released, the action plan unit 43 resumes the movement of the vehicle on condition that the suspension condition is not satisfied. That is, in a case where the parking brake device 5*a* and the brake pedal 24 are released, the autonomous movement of the vehicle can be resumed. As described above, since the autonomous movement of the vehicle can be resumed by releasing the parking brake device 5*a* and the brake pedal 24, it is possible to enhance the convenience of the parking assist system 101.

Figure 6:
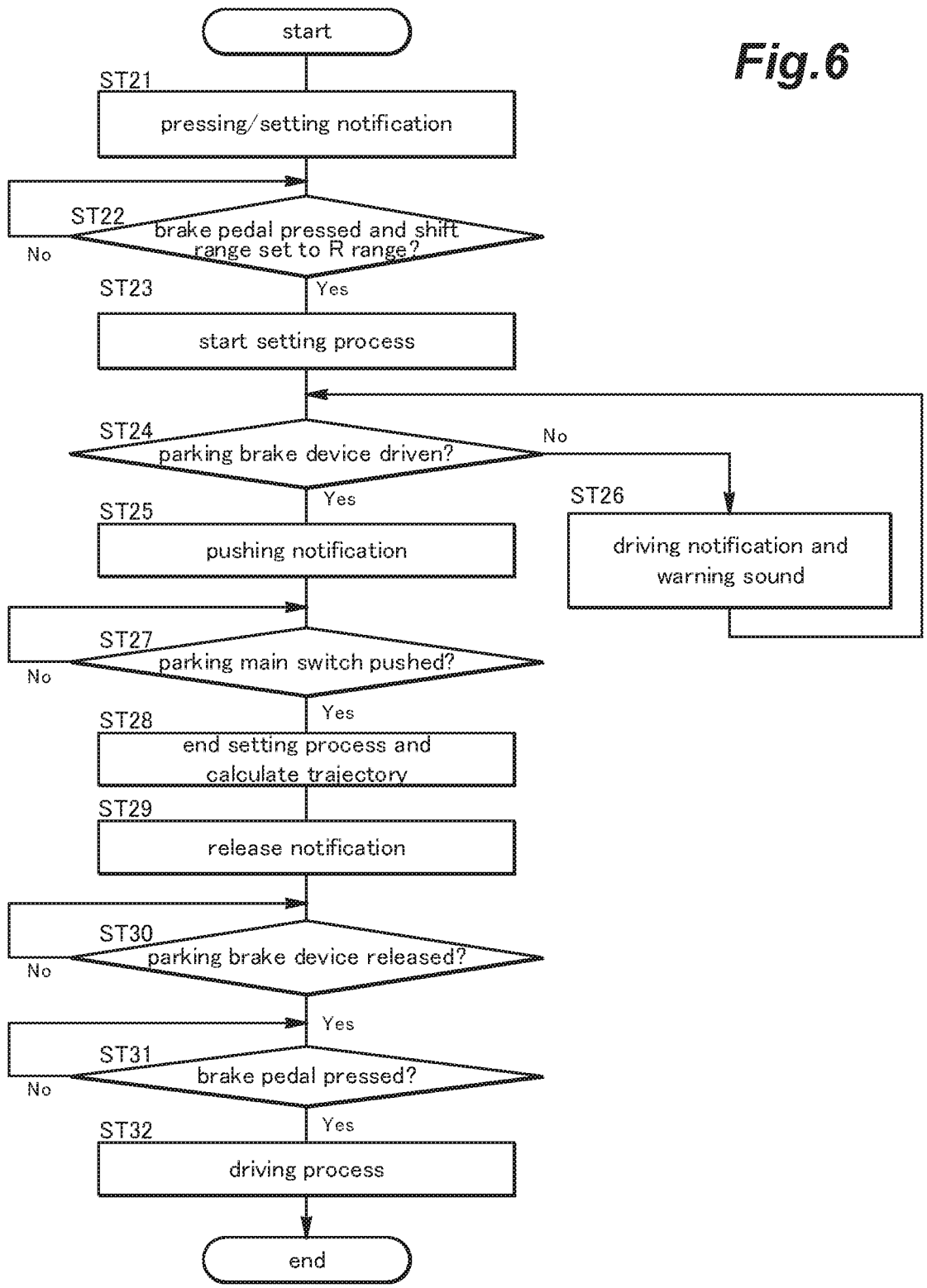
FIG. 6 is a flow chart of an automatic unparking process of a parking assist system according to a second embodiment of the present invention.

Next, the effects of the parking assist system 101 configured as described above will be described. As shown in FIG. 6, the setting process is started (step ST23) on condition that the brake pedal 24 is pressed and the shift position is set to the R position (step ST22). That is, the pressing of the brake pedal 24 and the setting (selecting) of the shift position to the R position are set to a driving reception condition to receive the operation to start the driving process. On the other hand, the release of the parking brake device 5*a* (step ST30) and the pressing of the brake pedal 24 (step ST31) are set to a driving start condition to start the driving process.

When the occupant inputs the target unparking position in step ST23 (namely, when the occupant selects the desired one unparking position candidate in step ST23), the occupant may mistakenly recognize that the vehicle will move autonomously and release the brake pedal 24 accordingly. At this time, when the parking brake device 5a is not driven, the brake force applied to the vehicle may become insufficient.

In view of such a situation, in the present embodiment, the parking main switch 34 is pushed (namely, the driving reception switch 34b receives the operation to start the driving process) on condition that the parking brake device 5a is driven. Therefore, the parking brake device 5a can be reliably driven before the parking main switch 34 is pushed. Accordingly, it is possible to drive the parking brake device 5a and thereby apply the brake force to the vehicle before the parking main switch 34 is pressed, even if the occupant mistakenly recognizes that the vehicle will move autonomously and releases the brake pedal 24. Therefore, it is possible to enhance the safety of the vehicle.

In a case where the parking brake device 5a is released after the setting process is started, the warning sound is generated by the sound generating device 33. Thereby, it is possible to more reliably make the occupant drive the parking brake device 5a after the setting process is started and before the operation to start the driving process is received (that is, before the parking main switch 34 is pushed in step ST27). Accordingly, it is possible to prevent the vehicle from moving autonomously after the setting process is started and before the operation to start the driving process is received.

Concrete embodiments of the present invention have been described in the foregoing, but the present invention should not be limited by the foregoing embodiments and various modifications and alterations are possible within the scope of the present invention. In the first and second embodiments, the parking assist system 1, 101 executes the automatic unparking process to unpark a parallel-parked vehicle. In other embodiments, the parking assist system 1, 101 may execute the automatic parking process to move the vehicle autonomously from the current position to a target parking position. For example, in the automatic parking process, the driving operation of the vehicle may be executed when the push of the parking main switch 34 and the pressing of the brake pedal 24 are performed simultaneously.

The pop-up window including the notification to urge the occupant to press the brake pedal 24 is not limited to the above embodiment. The pop-up window may include not only the notification to urge the occupant to press the brake pedal 24 but also an image or a video illustrating the pressing operation on the brake pedal 24.

In the above embodiment, the parking main switch 34 functions as both the setting reception switch 34a and the driving reception switch 34b, but the present invention is not limited to this embodiment. The parking assist system 1 may include the setting reception switch 34a and the driving reception switch 34b individually. In such a case, the action plan unit 43 may make the HMI 14 execute a notification to urge the operation on the driving reception switch 34b when the setting reception switch 34a is operated.

The trajectory calculated by the action plan unit 43 in step ST1 of the automatic unparking process is not limited to a trajectory to move the vehicle rearward from the current position. More specifically, the trajectory calculated by the action plan unit 43 in step ST1 of the automatic unparking process may be either of a trajectory to move the vehicle forward from the current position or a trajectory to move the vehicle rearward from the current position. Further, in step ST4 of the automatic unparking process of the first embodiment, the action plan unit 43 may make the HMI 14 notify the shift position that corresponds to a moving direction of the vehicle from the current position. Then, after the occupant operates the shift lever 25 for selecting the shift position notified by the HMI 14 in step ST4, the driving process of the vehicle may be executed in step ST11. In step ST11, after the driving process of the vehicle is started, the shift actuator 17 may change the shift position so as to correspond to the trajectory.

Figure 9:
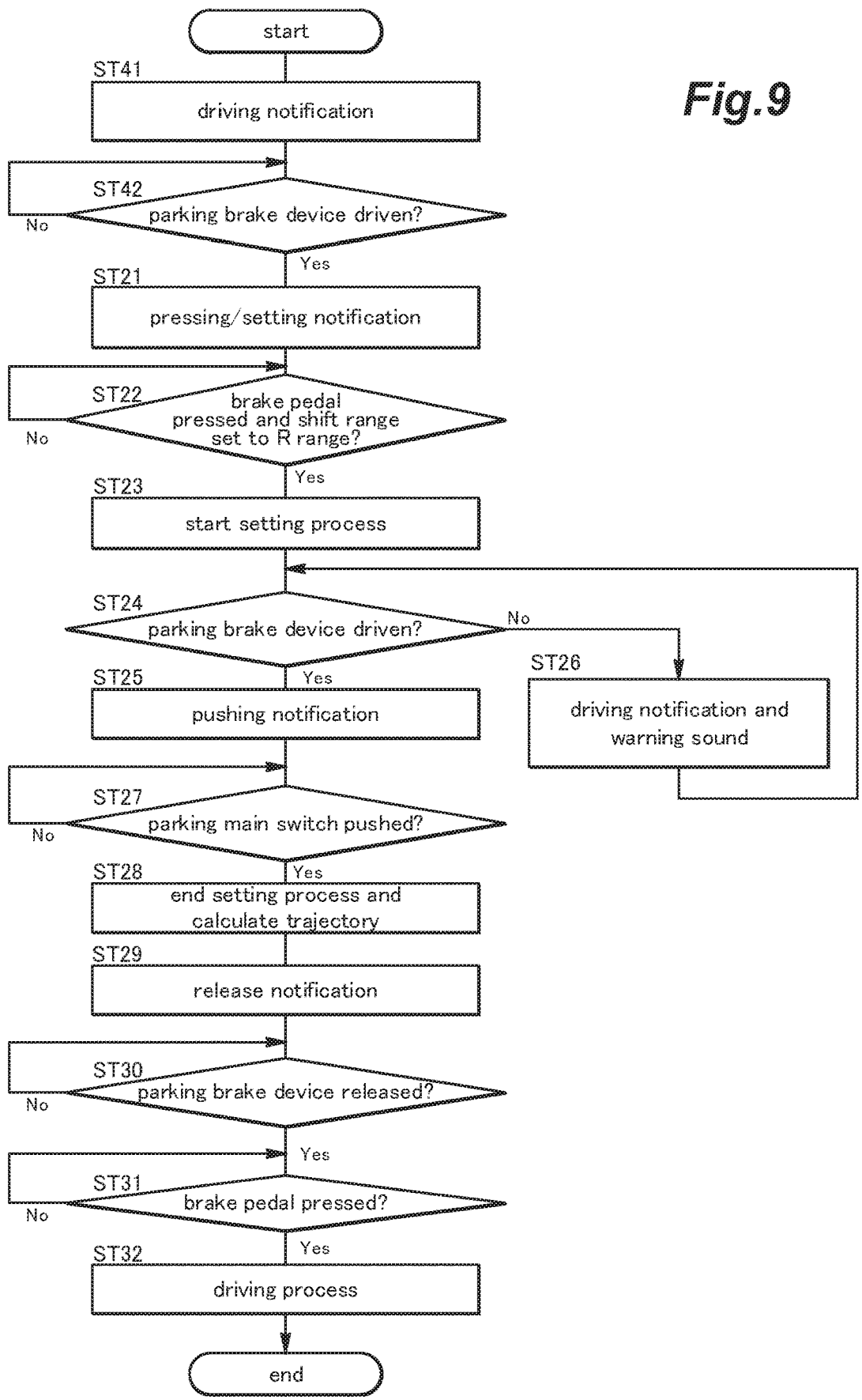
FIG. 9 is a flow chart of a modification of the automatic unparking process of the parking assist system according to the second embodiment of the present invention.
Figure 10:
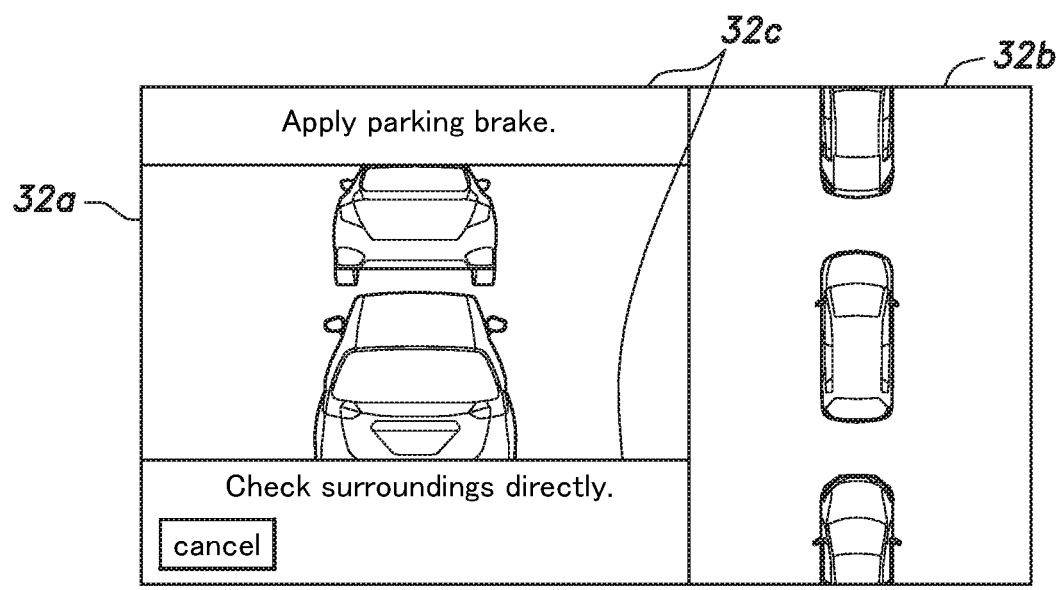
FIG. 10 is a diagram showing the screen display of the touch panel when the automatic unparking process is started in a state where the parking brake device is released in the modification of the automatic unparking process of the parking assist system according to the second embodiment of the present invention.

In the automatic unparking process executed by the parking assist system 101 of the second embodiment, as shown in FIG. 9, steps ST41 and ST42 may be executed before step ST21. In step ST41, the action plan unit 43 may make the touch panel 32 display the driving notification to urge the occupant to drive the parking brake device 5a. In step ST42, the action plan unit 43 may determine whether the parking brake device 5a is driven. In step ST41, the action plan unit 43 may display the driving notification in the notification window 32c above the bird's-eye image 32a, as shown in FIG. 10. In step ST42, in a case where the action plan unit 43 determines that the parking brake device 5a is not driven, the action plan unit 43 may wait at step ST42 (namely, the action plan unit 43 may execute step ST42 repeatedly) until the parking brake device 5a is driven. In a case where the action plan unit 43 determines that the parking brake device 5a is driven, the action plan unit 43 may execute step ST21.

In the automatic unparking process executed by the parking assist system 101 of the second embodiment, the action plan unit 43 may execute step ST24 before starting the setting process in step ST23. Alternatively, the action plan unit 43 may constantly execute step ST24 during the setting process. More specifically, the action plan unit 43 may check whether the parking brake device 5a is driven by executing step ST24 during the setting process, and suspend the setting process in a case where the parking brake device 5a is not driven. After suspending the setting process, the action plan unit 43 may execute step ST26 to display the driving notification to urge the occupant to drive the parking brake device 5a. In a case where the parking brake device 5a is driven after the driving notification is displayed, the action plan unit 43 may resume the setting process.

The invention claimed is:

1. A parking assist system configured to move a vehicle autonomously from a current position to a target position, comprising:
   a driving device configured to drive the vehicle;
   a control device configured to execute a setting process to set the target position and a driving process to control the driving device;
   a setting reception switch configured to receive an operation for starting the setting process;
   a driving reception switch configured to receive an operation for starting the driving process;
   a brake input member sensor configured to detect a driver's pressing of a brake pedal to brake the vehicle;
   a shift member configured to receive an operation of the driver for selecting a shift position of the vehicle;
   a parking brake device configured to apply a brake force to the vehicle; and
   a notification device configured to execute a notification to an occupant based on a signal from the control device,
   wherein the control device is configured to start the setting process after the setting reception switch is operated, wherein the control device is configured to start the driving process when a prescribed condition that includes the driver pressing the brake pedal is satisfied, wherein the control device is configured to drive the vehicle in response to release of the brake pedal in the driving process, wherein the prescribed condition further includes the operation on the shift member for selecting the shift position so as to correspond to an autonomous movement of the vehicle, and an operation of the driver to release the parking brake device, wherein the control device is configured to make the notification device execute a notification to urge the operations for selecting the shift position so as to correspond to the autonomous movement of the vehicle, and for pressing the brake pedal, a notification to urge an operation to apply the parking brake device after selecting the shift position and pressing the brake pedal, a notification to urge the operation of the driving reception switch when the parking brake device is applied, and a notification to urge the operation to release the parking brake device after the operation of the driving reception switch in the order described, and wherein the control device starts the driving process when the pressing of the brake pedal is kept.

2. The parking assist system according to claim 1, wherein at a start of the driving process, the control device makes the notification device execute a notification that the autonomous movement of the vehicle will start.

3. The parking assist system according to claim 2, wherein in a case where the brake input member sensor does not detect the driver's pressing of the brake pedal when the driving reception switch is operated, the control device makes the notification device execute a notification to urge the driver's pressing of the brake pedal.

4. The parking assist system according to claim 1,
wherein when the setting reception switch is operated, the control device makes the notification device execute a notification to urge the operation of the driving reception switch.

5. The parking assist system according to claim 1, wherein in a case where the prescribed condition is not satisfied when the driving reception switch is operated, the control device does not start the driving process, and thereafter, when the prescribed condition is satisfied and the driving reception switch is operated again, the control device starts the driving process.

6. The parking assist system according to claim 1, wherein in a case where the current position is a parallel parking position in which the vehicle is located along a passage, the control device sets the target position to one lateral side of an object in front of the current position in the setting process.

7. The parking assist system according to claim 1, further comprising a shift actuator configured to change the shift position, wherein the control device is configured to calculate a trajectory to move the vehicle forward or backward from the current position and to make the notification device notify the shift position that corresponds to a moving direction of the vehicle from the current position, and in a case where the shift member receives the operation for selecting the shift position notified by the notification device, the shift actuator changes the shift position so as to correspond to the trajectory on or after a start of the driving process.

8. The parking assist system according to claim 1, wherein when the driving reception switch is operated after the setting process is completed, the control device starts the driving process on a condition that the prescribed condition is satisfied.

9. The parking assist system according to claim 1,
wherein in a case where a prescribed driving reception condition is satisfied after the setting reception switch is operated, the control device makes the driving reception switch receive the operation for starting the driving process, after the driving reception switch is operated, in a case where the setting process is completed and a prescribed driving start condition is satisfied, the control device starts the driving process to move the vehicle to the target position set in the setting process, the prescribed driving reception condition includes a condition that the shift position is set to a reverse position, a condition that the driver presses the brake pedal, and a condition that the parking brake device is applied, the prescribed driving start condition includes a condition that the parking brake device is released and a condition that the driver presses the brake pedal, and the control device is configured to drive the vehicle in response to release of the brake pedal in the driving process.

10. The parking assist system according to claim 9, further comprising a warning device configured to generate a warning sound, wherein in a case where the parking brake device is released after the target position is set and before the driving reception switch is operated, the control device makes the warning device generate the warning sound.

11. The parking assist system according to claim 9, wherein in a case where the parking brake device is applied or the driver presses the brake pedal while the driving process is being executed, the control device suspends the autonomous movement of the vehicle.

12. The parking assist system according to claim 11, wherein in a case where the parking brake device and the brake pedal are released after the control device suspends the autonomous movement of the vehicle, the control device resumes the autonomous movement of the vehicle.

* * * * *